United States Patent
Jass et al.

(10) Patent No.: US 11,245,695 B2
(45) Date of Patent: *Feb. 8, 2022

(54) SECURE TWO-WAY AUTHENTICATION USING ENCODED MOBILE IMAGE

(71) Applicant: VIVIAL MOBILE LLC, Dayton, OH (US)

(72) Inventors: Nicole Jass, Aurora, CO (US); Matthew Brown, Colorado Springs, CO (US)

(73) Assignee: VIVIAL MOBILE LLC, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,879

(22) Filed: Apr. 23, 2020

(65) Prior Publication Data
US 2020/0252397 A1    Aug. 6, 2020

Related U.S. Application Data

(63) Continuation of application No. 15/785,672, filed on Oct. 17, 2017, now Pat. No. 10,673,849, which is a
(Continued)

(51) Int. Cl.
*G06F 21/44*    (2013.01)
*H04L 29/06*    (2006.01)
(Continued)

(52) U.S. Cl.
CPC ........ *H04L 63/0869* (2013.01); *G06F 21/445* (2013.01); *H04L 67/02* (2013.01);
(Continued)

(58) Field of Classification Search
CPC ........ G06F 21/445; G06F 21/44; G06F 21/36; H04W 4/00; H04W 12/06; H04L 63/0869; H04L 63/0853; H04L 67/02; H04L 67/306
See application file for complete search history.

(56) References Cited

U.S. PATENT DOCUMENTS

| 8,813,184 B2 | 8/2014 | Hirose |
| 9,338,164 B1 | 5/2016 | Liu et al. |

(Continued)

OTHER PUBLICATIONS

Eurpean Patent Office, "Office Action Regarding European Patent Application No. 15 850 832.5", dated Jun. 21, 2019, p. 4, Published in: EP.

(Continued)

*Primary Examiner* — David J Pearson
(74) *Attorney, Agent, or Firm* — Neugeboren O'Dowd PC

(57) ABSTRACT

A method of digital authentication and related devices are disclosed. The method includes providing a scanning application on a computing device prior to scanning a website feature, and scanning website feature, the website feature having been displayed on a web page of another computing device. The method includes sending information related to the scanned website features to a processing system; and using the information related to the scanned website features to authenticate the web page on the other computing device, and enable one or more web page components of the web page. The web page components include at least one of (a) automatically setting up a new account on the web page with user profile information, (b) completing a purchase on the web page, or (c) automatically logging the user into the website.

20 Claims, 10 Drawing Sheets

Related U.S. Application Data continuation of application No. 14/882,321, filed on Oct. 13, 2015, now Pat. No. 9,825,947.

(60) Provisional application No. 62/063,245, filed on Oct. 13, 2014.

(51) Int. Cl.
    *H04L 29/08* (2006.01)
    *H04W 4/00* (2018.01)
    *H04W 12/06* (2021.01)

(52) U.S. Cl.
    CPC .......... *H04L 67/306* (2013.01); *H04W 4/00* (2013.01); *H04W 12/06* (2013.01)

(56) References Cited

U.S. PATENT DOCUMENTS

| | | | |
|---|---|---|---|
| 9,825,947 B2* | 11/2017 | Jass | H04L 67/306 |
| 10,673,849 B2* | 6/2020 | Jass | H04W 4/00 |
| 2002/0029341 A1 | 3/2002 | Juels et al. | |
| 2006/0253581 A1 | 11/2006 | Dixon et al. | |
| 2008/0244700 A1 | 10/2008 | Osborn et al. | |
| 2011/0145899 A1 | 6/2011 | Cao et al. | |
| 2013/0111208 A1 | 5/2013 | Sabin | |
| 2013/0219479 A1 | 8/2013 | De Soto et al. | |
| 2013/0262858 A1 | 10/2013 | Neuman et al. | |
| 2014/0181911 A1 | 6/2014 | Kula | |
| 2015/0089613 A1 | 3/2015 | Tippett et al. | |
| 2015/0244698 A1 | 8/2015 | Zheng | |
| 2016/0105434 A1 | 4/2016 | Jass | |

OTHER PUBLICATIONS

Lamelas Polo, Yvan, "Communication Pursuant To Article 94(3) EPC Regarding European Patent Application No. 15850832.5", dated Jul. 20, 2021, p. 7, Published in: EP.

Pearson, David, "Final Office Action Regarding U.S. Appl. No. 15/785,672", dated Jan. 2, 2020, p. 11, Published in: US.

Pearson, David, "Office Action Regarding U.S. Appl. No. 15/785,672", dated Jul. 10, 2019, p. 21, Published in: US.

Percival, Shane, "Response to Final Office Action Regarding U.S. Appl. No. 15/785,672", dated Feb. 4, 2020, p. 8, Published in: US.

Percival, Shane, "Response to Office Action Regarding U.S. Appl. No. 15/785,672", dated Oct. 9, 2019, p. 15, Published in: US.

Markfort, Iris-Anne, "Response to Office Action Regarding European Patent Application No. 15 850 832.5", dated Jul. 23, 2019, p. 4, Published in: EP.

Nickitas-Etienne, Athina, "International Preliminary Report on Patentability Re Application No. PCT/US2015/055384", dated Apr. 27, 2017, p. 8, Published in: CH.

Copenheaver, Blaine R., "International Search Report and Written Opinion re Applcation No. PCT/US2015/055384", dated Dec. 28, 2015, p. 9, Published in: WO.

Clef, "How does two-factor authentication protect my users?", 2015, p. 9, Published in: US.

Allan, Ant, "Magic Quadrant for User Authentication", Mar. 7, 2013, p. 55, Publisher: Gartner, Published in: US.

Lee, Jason, "Office Action Non-Final Rejection Re App No. 14882321", dated Feb. 16, 2017, p. 32, Published in: US.

Lamelas Polo, Yvan, "Extended European Search Report Re 15850832,5-1213/3207684 PCT/US2015055384", dated May 9, 2018, p. 9, Published in: DE.

Ping Identity Corporation, "The Identity Security Company", 2014, p. 2, Published in: US.

Schneider, Laura, "Response to Office Action Re U.S. Appl. No. 14/882,321", dated May 15, 2017, p. 17, Published in: US.

\* cited by examiner

SECURE TWO-WAY AUTHENTICATION USING ENCODED MOBILE IMAGE

PRIORITY

This application is a continuation of U.S. patent application Ser. No. 15/785,672, filed Oct. 17, 2017 and entitled "Secure Two-Way Authentication Using Encoded Mobile Image"; which is a continuation of U.S. patent application Ser. No. 14/882,321, filed Oct. 13, 2015, U.S. Pat. No. 9,825,947, issued Nov. 21, 2017, and entitled "Secure Two-Way Authentication Using Encoded Mobile Image," which claims priority to U.S. Provisional Application No. 62/063,245, filed Oct. 13, 2014 and entitled "Secure Two-Way Authentication Using Encoded Mobile Image," all of which are incorporated herein by reference in their entireties.

FIELD OF THE INVENTION

This invention is related to digital authentication of users and websites.

BACKGROUND OF THE INVENTION

On-line user authentication is increasingly critical for software-as-a-service (SAAS) providers, as well as for any digital product/service that needs to determine user authenticity. When a user accesses a website or any on-line service, either by entering a website address in a browser, through a search, by clicking on a link, or through any other scenario, the user may seek to authenticate the website or on-line service to ensure that it is a legitimate website/service that is actually provided by the entity the user is seeking to interact with. Frequently, users require assurances that accessed websites and on-line services do not have any known or unknown malicious intent upon accessing the website or service. For example, prior to accessing specific features in a website or offered through a service, users often require confirmation that the website/service will not install a virus on the device through which they are accessing the website/service, and/or will not steal their personal information. Similarly, website owners and SAAS providers have a need to securely authenticate users that access the owners' website/service, in order to ensure that the user is accessing and managing proper account information, as well as to enable user-specific website/service features such as, but not limited to, user-specific transaction features.

SUMMARY OF THE INVENTION

An exemplary method of digital authentication includes providing a scanning application on a computing device prior to scanning one or more website features, and scanning the one or more website features, the one or more website features having been displayed on a web page of another computing device. The exemplary method includes sending information related to the one or more scanned website features to a processing system, and using the information related to the one or more scanned website features to authenticate the web page on the another computing device, and enable one or more web page components of the web page. The one or more web page components include at least one of (a) automatically setting up a new account on the web page with user profile information, (b) completing a purchase on the web page, or (c) automatically logging the user into the website.

An exemplary non-transitory, tangible, computer-readable storage medium for a computing device is encoded with processor-readable instructions which, together, include a scanning application to perform a method of authenticating a device. The method includes scanning one or more website features, the one or more website features having been displayed on a web page of another computing device. The method includes ending information related to the one or more scanned website features to a processing system. The method includes using the information related to the one or more scanned website features to authenticate the web page on the other computing device, and enable one or more web page components of the web page. The one or more web page components include at least one of (a) automatically setting up a new account on the web page with user profile information, (b) completing a purchase on the web page, and (c) automatically logging the user into the website.

An exemplary method of providing digital authentication includes accessing a website from a mobile computing device, wherein the website includes at least one website feature. The method includes displaying the at least one website feature on the mobile computing device, selecting the at least one website feature, launching a scanning application on the mobile computing device, displaying first new information on the website, and displaying second new information in the scanning application. The method includes selecting a scanning application feature when the first new information is the same as the second new information, authenticating the website, accessing one or more website features, and enabling web page components. The web page components include at least one of (a) automatically setting up a new account on the web page with user profile information, (b) completing a purchase on the web page, and (c) automatically logging the user into the website.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

One authentication process described herein can include various features to ensure the website is actually being provided by the entity displayed thereon. These features can include but are not limited to an item the user possesses such as a mobile phone, chip, ID card, or key fob; something the user knows such as a password, or pin; or something the user comprises such as a biometric signature like a fingerprint, heartbeat, or retina image. In order to properly authenticate websites for users, and users for websites, a technology has been developed to enable secure two-way authentication between users and websites using a mobile phone, a mobile barcode, and a matching item such as, but not limited to, an image. Through the use of this system, consumers may interact with websites using their mobile phone, allowing for quick website authentication that does not require a customer to answer challenge questions when they sign into the website on new device. The system also adds an additional security feature for users of requiring a mobile phone to authenticate with a website. Similarly, additional security is provided to website owners by requiring a mobile device for user sign-in and also provides customers with a simple way to sign-in. Additional features can be added to the user authentication including items that the user knows such as, but not limited to, passwords or pins, and/or can also include a biometric confirmation such as, but not limited to a fingerprint or heartbeat scan. Furthermore, application downloads may be increased by creating an integrated website and mobile computing device application.

Figure 1:
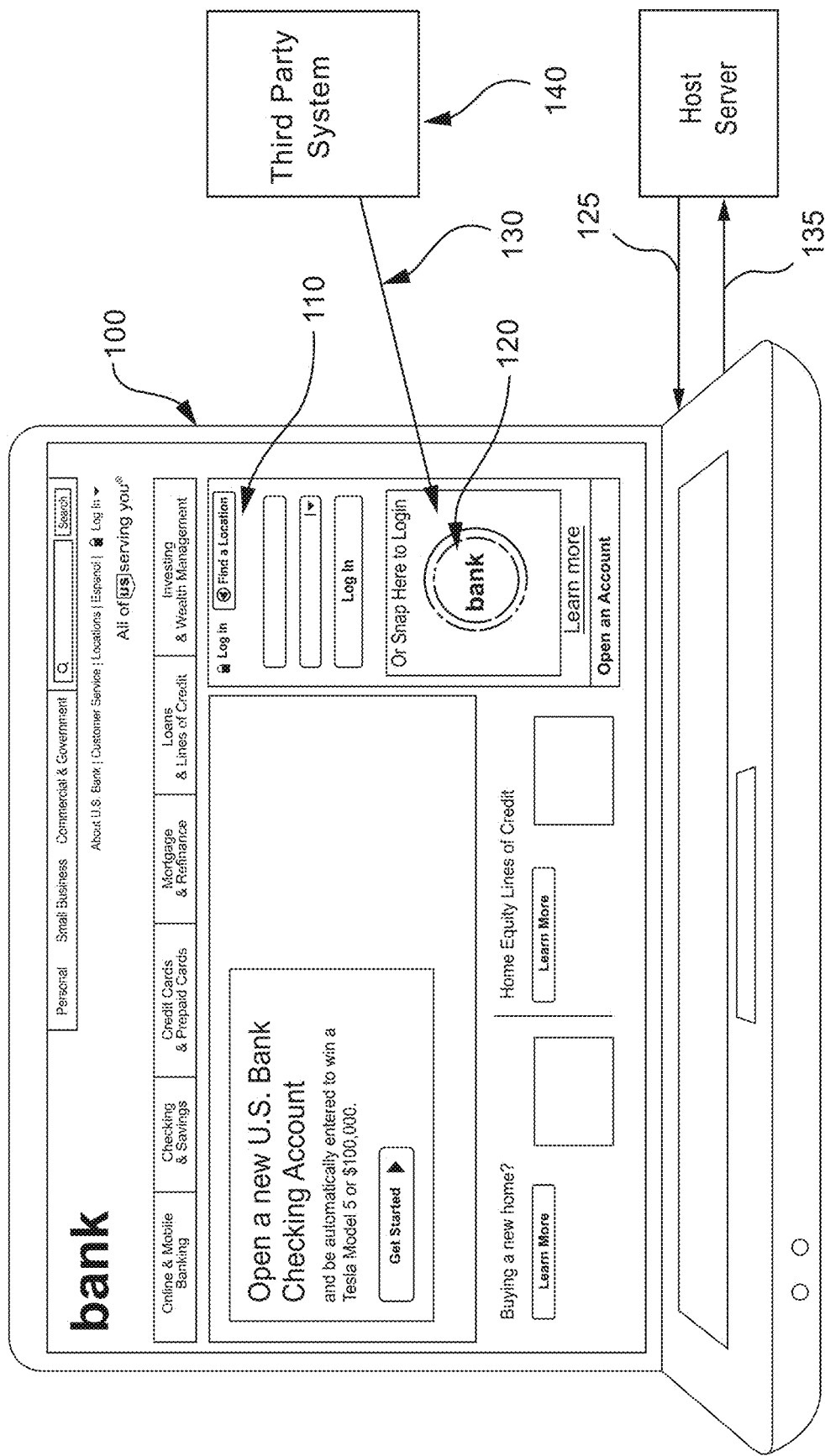
FIG. 1 depicts a representation of a first computing device, third party system, and host server according to one embodiment of the invention.

Turning first to FIG. 1, seen is a first computing device 100. In one embodiment, the first computing device 100 displays a website 110 (also referred to herein as a web page 110 or a service or SAAS) comprising a website feature 120. However, it is contemplated that the website feature 120 may be incorporated into other operations on the first computing device 100 besides a website 110 such as, but not limited to an application. In any event, the website feature 120 may comprise a display having an encoded value associated with the display. One such display may be seen in FIG. 3, in which the website feature 320 displays an image. The website feature 120 may comprise a plug-in website feature 120 or an embedded website feature 120. One plug-in website feature 120 may comprise a separate software component that adds a specific feature to the already existing website 110, whereas the embedded web site feature 120 may comprise a portion of the website code itself. The value associated with the display in the plug-in website feature 120 or embedded website feature 120 may also be referred to herein as a "mobile barcode." One mobile barcode may be dynamically generated and fed 130 to the website feature 120 via a third-party platform 140. For example, upon requesting 125 a host server 115 (with the host server 115 comprising the website 110 information to display on the device 100, with the information/mobile barcode being provided to the device 100 in a response 135 to the request 125) of the website 110 or on-line service provide the website 110 or service to the device 110, a display session for the web page 110 may be created by the server 115. Each website display session may be associated with a unique mobile barcode. One such mobile barcode may comprise a SNAPTAG® provided by SpyderLynk LLC, a Colorado Limited Liability Company whose principal place of business is 9559 S. Kingston Ct. Suite 200, Englewood, Co. 80112.

Figure 2:
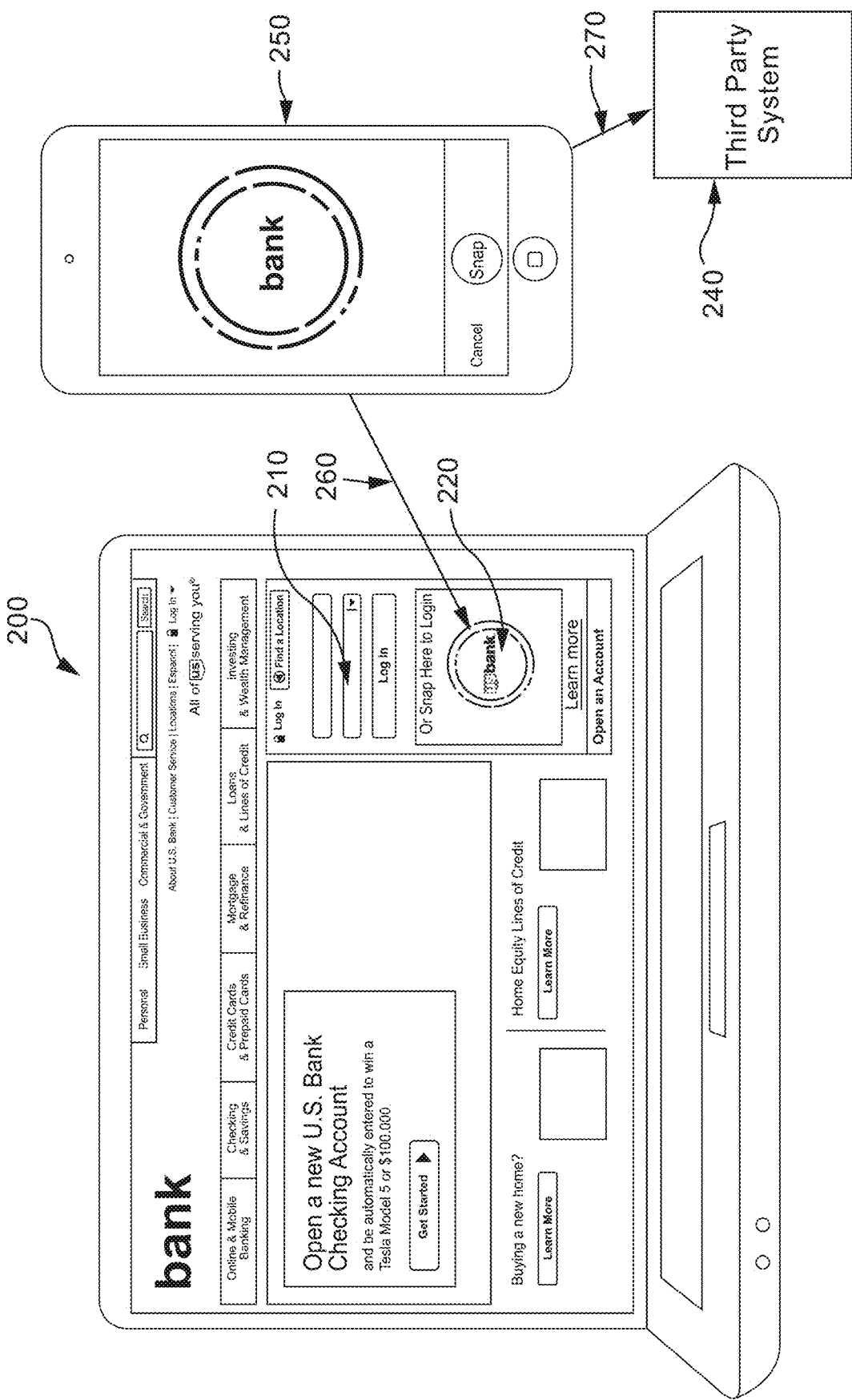
FIG. 2 depicts a representation of a first computing device, second computing device, and third party system according to one embodiment of the invention.

Turning now to FIG. 2, seen is the first computing device 200 and a second computing device 250. The first computing device 200 may comprise a laptop computer, desktop computer, tablet computing device, or any other computing device comprising a display. The second computing device 250 may comprise a mobile computing device or may comprise any other computing device with a camera or any other scanning device. In one such embodiment, upon accessing the website 210 with the first computing device 200, a user may be informed that the website feature 220 must be scanned with the second computing device 250. For example, a pop-up window may be displayed which informs the user that the mobile barcode in the website feature 220 may be scanned with an application on the second computing device 250. Such an application may be an application provided by an owner of the website 210 or may be an application provided by the third-party 240. Such an application may be branded similarly as the website 210. The pop-up display may enable the user to send a link or other information to the second mobile computing device 250 which enables the second mobile computing device 250 to download the application on the device 250 and subsequently scan the website feature 220 displayed on the web page 210.

Prior to an initial use of the application on the second computing device 250, a user of the device 250 may be prompted to provide user profile information on the second computing device 250 which will be associated with the application. For example, the application may prompt the user to provide the user's name, email address, and login information (e.g., username/password) for the website 210 and/or any other websites the user may use the application to securely access. Upon entering the prompted information into the application, the user uses the application to scan 260 the mobile barcode. A scan 260 of the mobile barcode may comprise using a camera associated with the second mobile computing device 250 with take one or more pictures of the mobile barcode/website feature 220. Upon scanning 260 the mobile barcode, the application may send 270 the mobile barcode image and/or information related to the mobile barcode image, along with any login information (e.g. username/password) associated with the website 210 to a third party system 240, also referred to herein as a processing system 240 or processing device 240. Alternatively, or additionally to the website-specific login information and/or the information associated with the scan (e.g., image, location/placement of one or more features in the scan), a website/app token may also be sent 270 to the third-party system 240. Upon receiving the mobile barcode and token/login information the third-party system 240 may authenticate the user using information associated with or encoded within the mobile barcode, accessing a database on the third-party system 240 comprising information related to one or more previously-saved tokens, mobile barcodes and/or user login information. For example, only e-mail information may be stored in the database.

Figure 3:
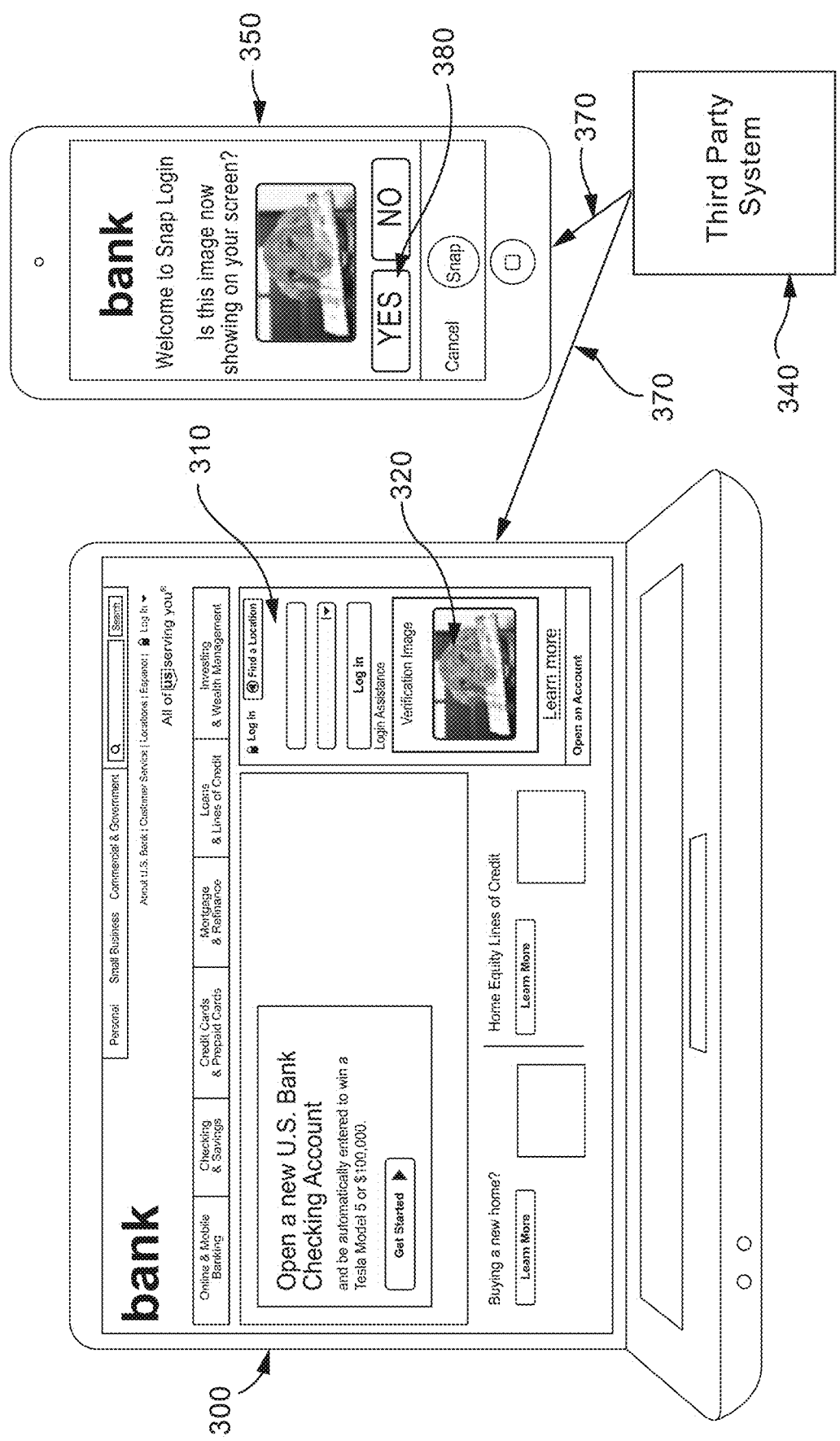
FIG. 3 depicts a representation of a first computing device, second computing device, and host server according to one embodiment of the invention.

Turning now to FIG. 3, seen is an example of one type of authentication that may be implemented by the third-party system 340 to authenticate the user with the website 310 on the first computing device 300 through the use of the second mobile computing device 350. For example, the third-party system 340 may send 370 information for engagement on the first computing device and the second computing device. The information for engagement may include an image sent to the website feature 320 for display on the website 310 and to the application for display on the second computing device 350. This image may be an image that is randomly-selected by the third-party 340 or may be an image previously selected by the user, such as, but not limited to, during the installation/set-up of the app on the second device 250. Such an image may display any type of picture (e.g., a house, animal, sporting equipment, mountains, etc.) for this authentication step. Upon receiving the image(s) at the devices 300, 350, the same image is displayed on each device 300, 350. At this point, the user may be prompted on each device 300, 350, or just one of the devices, to confirm whether the same image is displayed on each device 300, 350. If so, the user may click a button 380 on the second computing device 350, or may otherwise verify that the same image is displayed.

Upon verifying the images are the same, the second mobile computing device 350 may send a communication to the third-party system 340 confirming the images are the same. The user may enter a pin on the device 350 or other information such as, but not limited to, biometric information, may be entered and/or provided by the application on the second mobile computing device 350 and provided in this communication to the third party system 340 for additional security. One or more third-party systems 340 may be used to process this pin and/or other information. For example, a first third-party system 340 may provide process a communication received from the second computing device 350 and a communication with a second third-party system 340 may be implemented so the second third-party system 340 handles the biometric or other information processing. The third-party systems 340 may then send one or more communications 370 to the website 310 and/or application (which may comprise information related to the rendering of the website 310 at the first computing device 300 and/or one more third computing devices (not shown)), enabling the user to access various website features associated with the session ID, token and/or login information presented (which may include the additional authentication features described above such as, but not limited to, a password, PIN and/or biometric confirmation). In one embodiment, the website 310 may then send a confirmation message back to the third party 340 to verify that the session ID and user information are approved for authentication. The third party system 340 and/or the first mobile computing device 300 may send a communication to the second mobile computing device 350 to inform the second mobile computing device 350 that the user has been approved for authentication.

Figure 4:
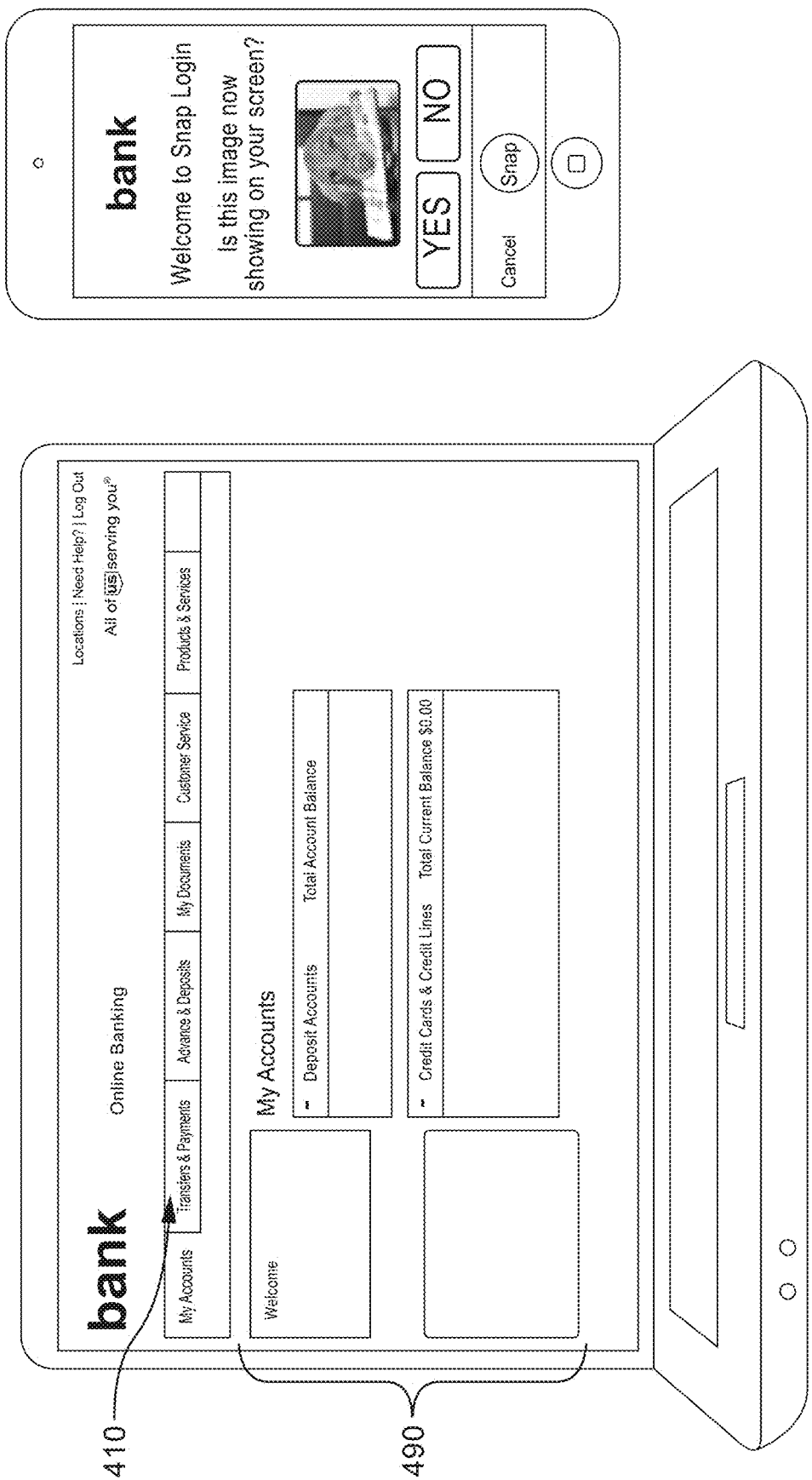
FIG. 4 depicts a representation of a first computing device and second computing device according to one embodiment of the invention.

Seen in FIG. 4 is one view of web site features 490 that may be displayed to the user upon authentication approval. For example, displayed is a "my accounts" feature, although other features such as, but not limited to, transaction features, are contemplated. Furthermore, a positive authentication notification message may be displayed on the website 410 to let a user know that the website has been fully authenticated and that the user is safe to access the website features.

It is further contemplated that a user may not want to provide any information (e.g. username/password) to the website 100 or third party system 340 seen in FIGS. 1 and 3 and elsewhere, herein. For example, a user may only use the scanning feature in the application on the second mobile computing device 250 seen in FIG. 2 to authenticate the website 210 that the user wishes to access. In one such embodiment, the user may scan the mobile barcode in the website 210 with the second mobile computing device 250.

Upon sending the scan to the third party system 240, the user would be presented with a random image within the website 210 as well as the screen on the second mobile computing device 250. The user would confirm (on the first and/or second mobile computing devices) that the same image is on both the second computing device 250 screen and the website 210. In such an embodiment, the third party 240 may then communicate with the website 210 and/or the user/second mobile computing device 250 to confirm with the website 210 has been authenticated. However, in such an embodiment, the third party 240 may not send any user info to the website 210, with the user using a preferences feature in the application setup process for determining when and how to share any information.

It is yet further contemplated that a user could scan the mobile barcode with the second mobile computing device 250, confirm the matching images as described above, and be automatically logged into the website 210 with information that has been previously stored on the third-party system 240. In such an embodiment, a user would essentially be logging into the website 210 without entering any information on the website 210. A user could be prompted to enter a PIN or a password on the second computing device 250, after image verification is complete, as an added layer of log-in security.

In the system seen and shown above with reference to FIGS. 1-4, a user may also scan the mobile barcode on the website 210 in order to setup a new account. For example, a user may confirm matching images on the website 210 and/or the second computing device 250 after conducting the scanning, as described above. At this point the user may click a "new account" button on the application, or a button comprising similar text. The third party system 240 may then send the user's information, which has already been entered by the user into the application on the second mobile computing device 250, to the website 210, with the website automatically setting up the new account in the website with this information.

It is contemplated that a user may also scan the mobile barcode in order to buy something using information stored in the mobile application and/or in the third party system 240. Furthermore, instead of, or in addition to, matching images to finalize the authentication process, a user may be asked to confirm that a sequence of letters and/or numbers or other symbols matches in the application and on the website 210. Alternatively, the user could be asked to confirm that a sound or video matches in the application and on the website 210. Also, instead of matching a randomly selected image, the image could have been pre-selected by the user or the image could be a logo or an image selected to be presented to the user from either the website owner and or an outside party. For example, the website 210 may present to the use an image provided/selected from the website. Or, the website 210 may provide an advertisement image to the user.

Figure 5A:
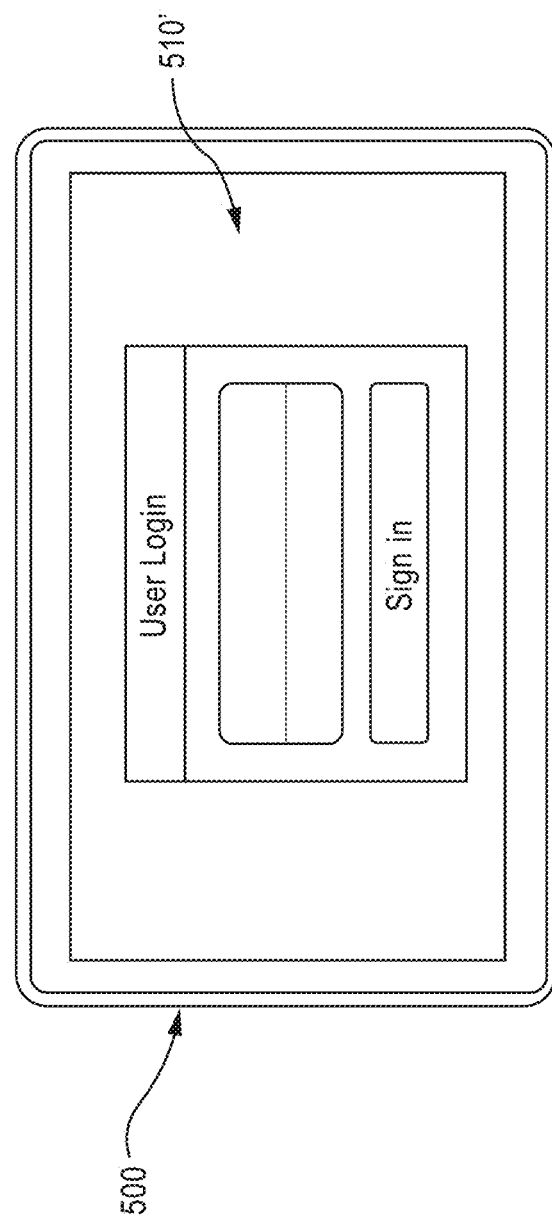
FIG. 5A depicts a prior art login screen.

Looking now at FIG. 5A, seen is a prior art website 510' requesting a username and password. In such a prior art website 510', upon accessing the website 510' with a first computing device 500, a user may sign-up to access the website 510 on the first computing device 500 by registering and subsequently entering a username/password on the first mobile computing device. However, this type of access requires using only a single device, the first mobile computing device 500, to access the website 510'.

Figure 5B:
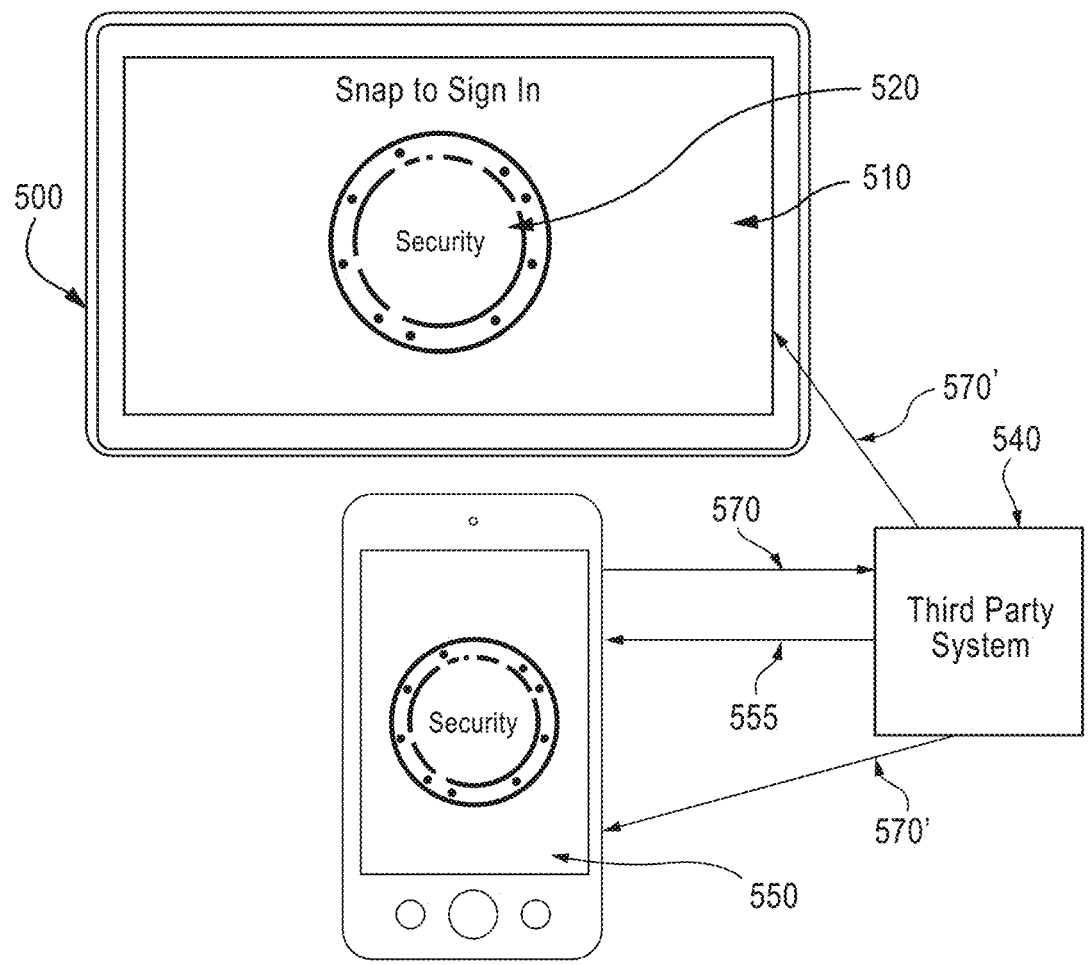
FIG. 5B depicts a representation of a first computing device, second computing device, and third party system according to one embodiment of the invention.

In order to provide additional security to the prior art website 510' seen in FIG. 5A, the website 510 seen in FIG. 5B was developed. In the FIG. 5B website 510, displayed is a single-use encoded image comprising a website feature 520. At this point, a user may be requested by the website 510 to download 555 and register an application, such as, but not limited to, a third-party application, on a second computing device 550 that may comprise a mobile computing device. The third-party application may be used to scan the website feature 520.

Figure 5C:
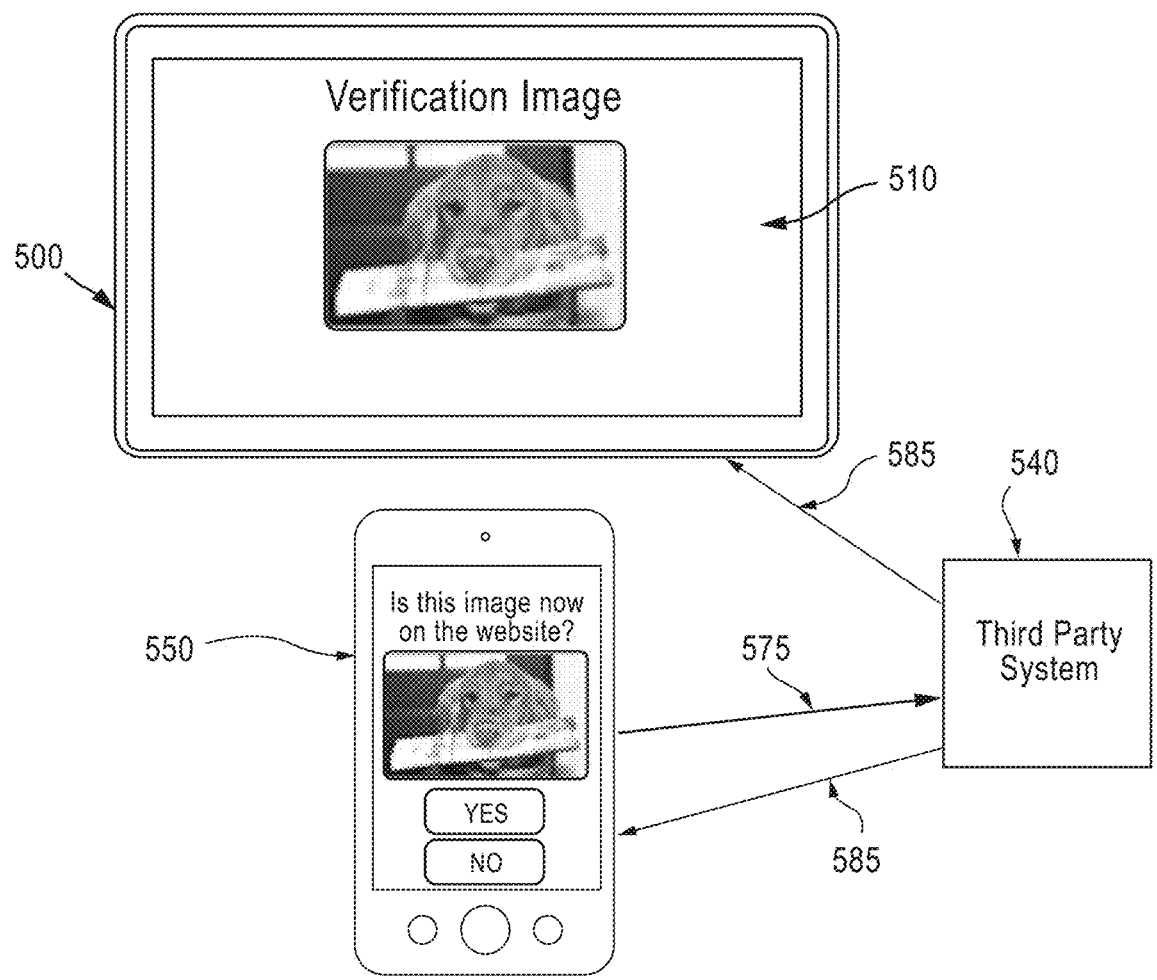
FIG. 5C depicts a representation of a first computing device, second computing device, and third party system according to one embodiment of the invention.

After scanning the website feature 520 with the downloaded 555 third-party application on the second computing device 550, the second computing device 550 may send 570 the scan to the third party 540. At this point, the third-party 540 may send 570' the same image for display on both the second computing device 550 and the first computing device 500, as seen in FIG. 5C. The user then verifies 575 with the third-party system 540 that the same image is displayed on both the second computing device 550 and the first computing device 500. The website 510 then receives 585 a token from the third party system 540 enabling the user to access the website 510, while the second computing device 550 receives 585 a confirmation message for display on the second computing device 550. Alternatively, or additionally, an email, text, or other message may be sent to the user informing them that they have been signed in to the website 510.

Although not shown in the figures, above, it is contemplated that a similar authentication process would also work with only the second mobile computing device 250, 350, 550, described above. One such second mobile computing device 250, 350, 550 may comprise a mobile computing device. For example, the mobile computing device may access a website such as, but not limited to the website 210, 310, 510 seen above. Such a website 210, 310, 510 may comprise a mobile website. Upon accessing the mobile website, a display of the website feature 220, 320, 520 shown above may be seen. Such a website feature 220, 320, 520 may comprise a mobile website feature. When the mobile website feature is displayed, a user of the mobile computing device may tap or otherwise access the mobile website feature on the website. Such a tap may open up a pre-installed scanning application on the mobile computing device. Alternatively, if the pre-installed scanning application is not installed on the mobile computing device, tapping the mobile website feature may prompt the user of the mobile computing device to download the scanning application. Upon launching the scanning application, the user may be prompted to enter a pin number or a password into the scanning application, or to provide a biometric confirmation. Furthermore, the user may be presented with an image in the scanning application, and the image may be related to the mobile website (e.g., a logo for the company that owns the website, etc.). Such an image may enable the user to verify that the website is legitimate and owned by the proper entity. After the user provides the necessary information (pin/password/biometric, etc.) and has verified that the website is legitimate, a button may be clicked on the scanning application. Doing so may log the user into the mobile website as well as return the user to the website to access the desired information that is associated with the pin/password/biometric information. Alternatively, a user may not provide any pin/password/biometric information and only verify that the website is legitimate. At such a point, the user may be taken back to the website, secure with the knowledge that the website is legitimate and able to enter any information into the website directly and securely through the mobile website's own login and authentication system.

Figure 7:
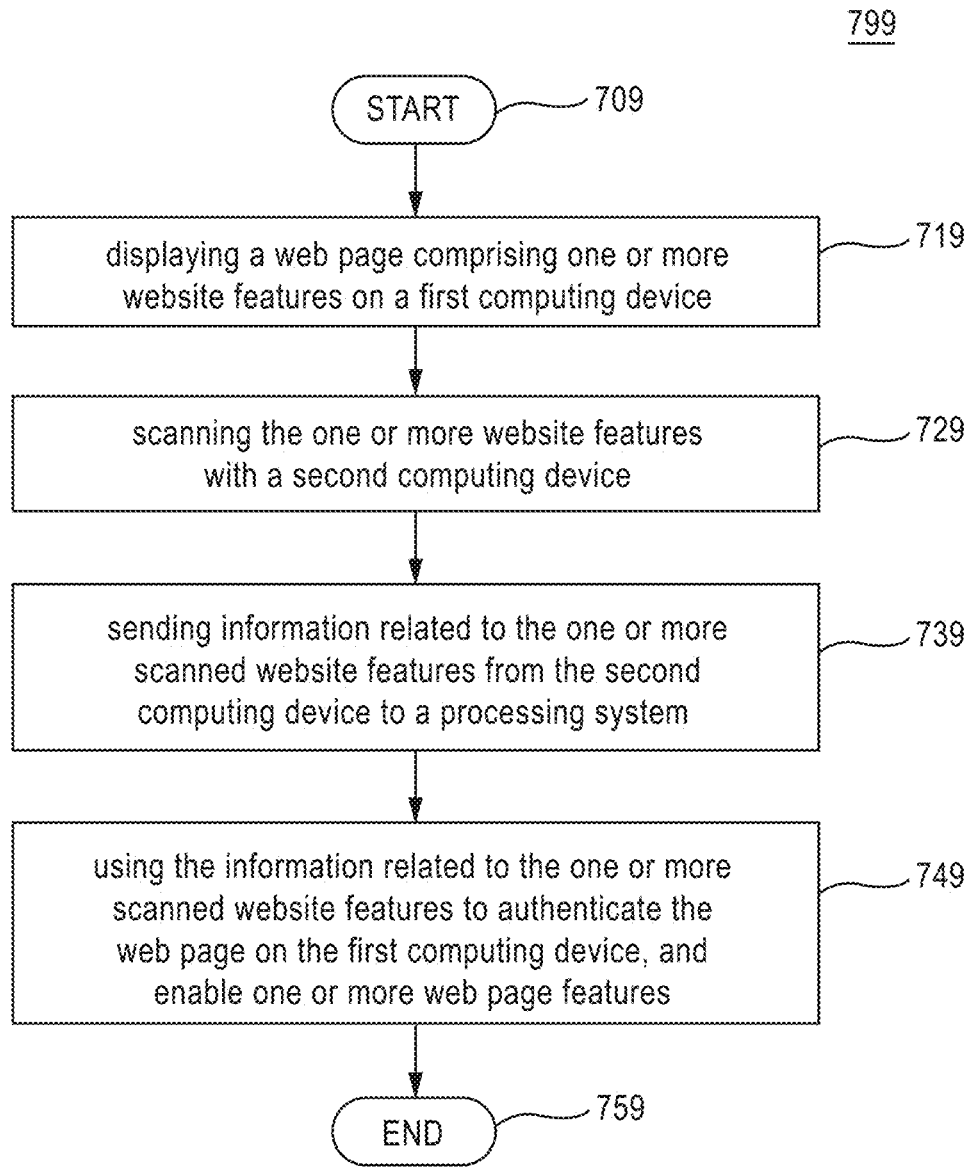
FIG. 7 depicts a method according to one embodiment of the invention.

Turning now to FIG. 7, seen is a method 799 of digital authentication. The method starts at 709 and at 719 comprises displaying a web page comprising one or more website features on a first computing device such as, but not limited to the first computing device 100 and website 110 and website feature 120 seen in FIG. 1 and described herein. At 729 the method 799 comprises scanning the one or more website features 120 with a second computing device, such as, but not limited to the second computing device 250 seen in FIG. 2. At 739 the method 799 comprises sending information related to the one or more scanned website features 120 from the second computing device 250 to a processing system such as, but not limited to, the third party system 240. Finally, at step 749 the method 799 comprises using the information related to the one or more scanned website features 120 to authenticate the web page 210 displayed on the first computing device 200 and enable one or more web page components.

Though not shown in FIG. 7, it is contemplated that the second computing device 250 may comprise a camera and a scanning application. In such an instance, scanning the one or more website features 120 with a second computing device comprises scanning the one or more website features with the scanning application, with the scanning application utilizing the camera.

The method 799 may further comprise installing a scanning application on the second computing device 250 prior to scanning the one or more website features 120. Additional steps may further include providing user profile information to at least one of the second computing device 250 and the processing system 240 prior to scanning the one or more website features 120. It is contemplated that the one or more web page components comprise at least one of: automatically setting up a new account on the web page 110 with the user profile information, and completing a purchase on the web page 110. The user profile information may comprise login information related to the web page 110.

Figure 8:
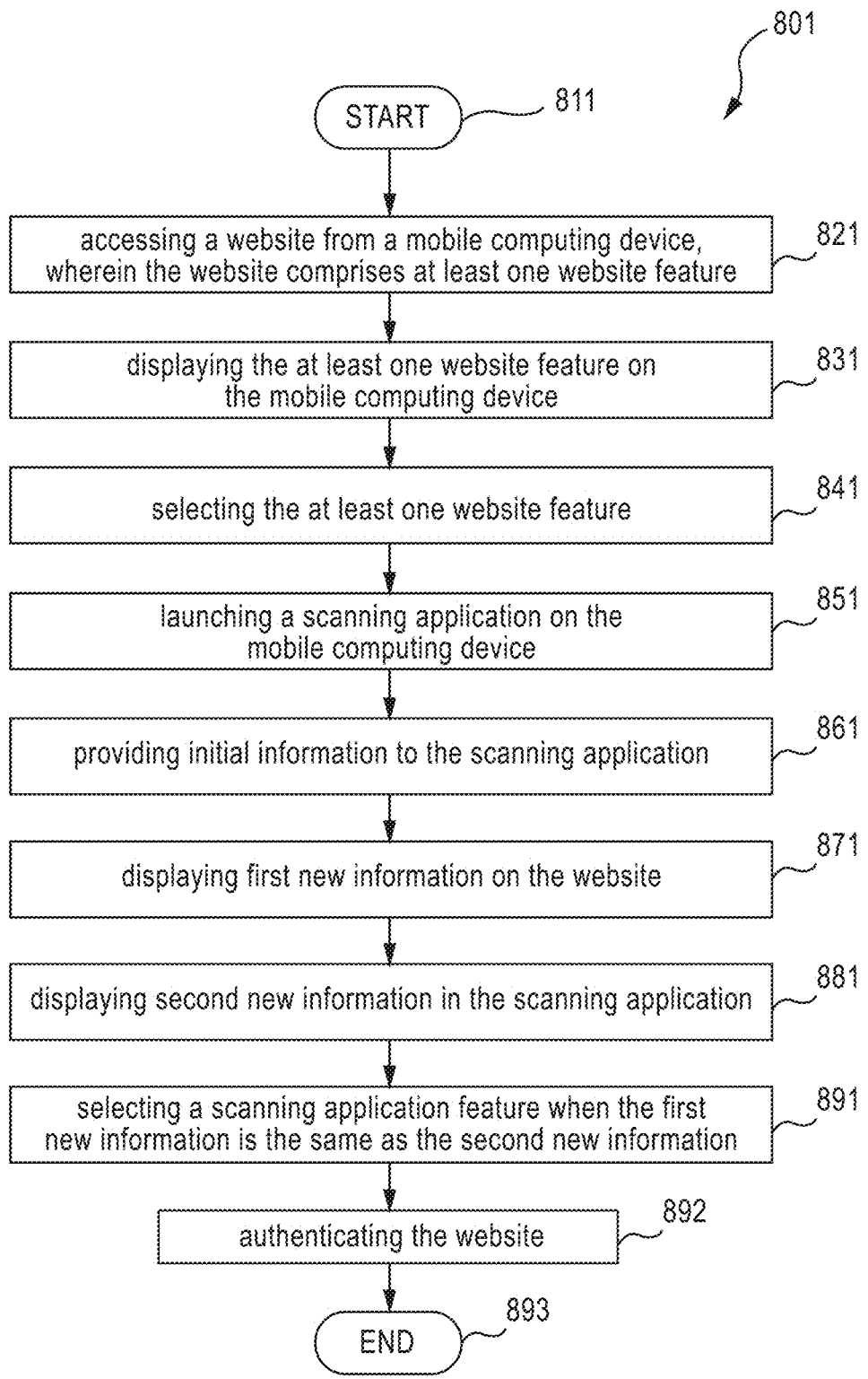
FIG. 8 depicts a method according to one embodiment of the invention.

Turning now to FIG. 8, seen is a method 801 of providing digital authentication. The method starts at 811 and at 821. One method 801 comprises accessing a website from a mobile computing device, wherein the website comprises at least one website feature. At 831, the method 801 comprises displaying the at least one website feature on the mobile computing device. At 841 the method 801 comprises selecting the at least one website feature. At 851 the method 801 comprises launching a scanning application on the mobile computing device. At 861 the method 801 comprises providing initial information to the scanning application. At 871 the method 801 comprises displaying first new information on the website. At 881 the method 801 comprises displaying second new information in the scanning application. At 891 the method 801 comprises selecting a scanning application feature when the first new information is the same as the second new information. At 892 the method 801 comprises authenticating the website, and at 893 the method 801 comprises accessing one or more website features.

The method 801 step of selecting the at least one website feature comprises tapping the at least one website feature on the touch screen. It is also contemplated that the method 801 may further comprise downloading the scanning application on the mobile computing device prior to launching the scanning application on the mobile computing device. Furthermore, the initial information may comprise at least one of a pin number, a password, and biometric information. The second information may comprise an image related to the website.

It is further contemplated that using the information related to the one or more scanned website features to authenticate the web page on the first computing device comprises displaying a first image in the one or more website features, displaying a second image in the scanning application, and confirming that the first image and the second image are the same image. The method may also comprise providing additional authentication information to the processing system, wherein the additional authentication comprises at least one of biometric information and password information.

Figure 6:
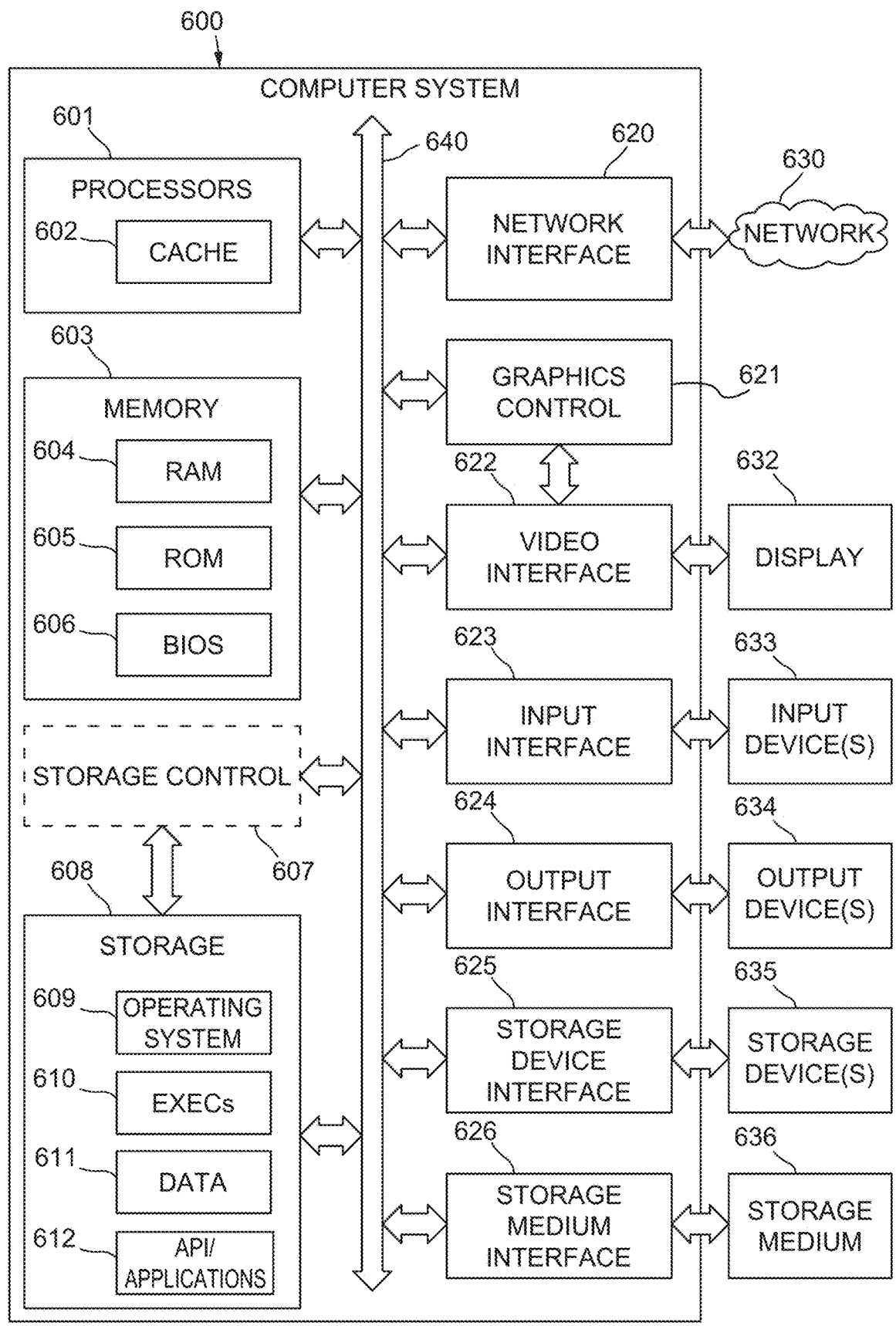
FIG. 6 depicts a diagrammatic representation of one embodiment of a computer system according to one embodiment of the invention.

The systems and methods described herein include various computing devices such as, but not limited to, the computing first computing device 100 and second computing device 250. The computing devices described herein may also be referred to as a computing system or a computer system. FIG. 6 shows a diagrammatic representation of one embodiment of a computer system 600 within which a set of instructions can be executed to cause a device to perform or execute any one or more of the aspects and/or methodologies of the present disclosure. The components in FIG. 6 are examples only and do not limit the scope of use or functionality of any hardware, software, firmware, embedded logic component, or a combination of two or more such components implementing particular embodiments of this disclosure. Some or all of the illustrated components can be part of the computer system 600. For instance, the computer system 600 can be a general purpose computer (e.g., a laptop computer) or an embedded logic device (e.g., an FPGA), to name just two non-limiting examples.

Computer system 600 includes at least one processor 601 such as a central processing unit (CPU) or an FPGA to name two non-limiting examples. Any of the subsystems described throughout this disclosure could embody the processor 601. The computer system 600 may also comprise a memory 603 and a storage 608, both communicating with each other, and with other components, via a bus 640. The bus 640 may also link a display 632, one or more input devices 633 (which may, for example, include a keypad, a keyboard, a mouse, a stylus, a touch screen, etc.), one or more output devices 634, one or more storage devices 635, and various non-transitory, tangible computer-readable storage media/medium 636 with each other and with one or more of the processor 601, the memory 603, and the storage 608. All of these elements may interface directly or via one or more interfaces or adaptors to the bus 640. For instance, the various non-transitory, tangible computer-readable storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 601 (or central processing unit(s) (CPU(s))) optionally contains a cache memory unit 602 for temporary local storage of instructions, data, or computer addresses. Processor(s) 601 are configured to assist in execution of computer-readable instructions stored on at least one non-transitory, tangible computer-readable storage medium. Computer system 600 may provide functionality as a result of the processor(s) 601 executing software embodied in one or more non-transitory, tangible computer-readable storage media, such as memory 603, storage 608, storage devices 635, and/or storage medium 636 (e.g., read only memory (ROM)). For instance, the methods 799, 801 shown in FIGS. 7 and 8 may be embodied in one or more non-transitory, tangible computer-readable storage media. The non-transitory, tangible computer-readable storage media (or medium) may store software comprising instructions that implements particular embodiments, such as the methods 799, 801 and processor(s) 601 may execute the software. Memory 603 may read the software from one or more other non-transitory, tangible computer-readable storage media (such as mass storage device(s) 635, 636) or from one or more other sources through a suitable interface, such as network interface 620. Any of the subsystems herein disclosed could include a network interface such as the network interface 620. The software may cause processor(s) 601 to carry out one or more processes or one or more steps of one or more processes described or illustrated herein. Carrying out such processes or steps may include defining data structures stored in memory 603 and modifying the data structures as directed by the software. In some embodiments, an FPGA can store instructions for carrying out functionality as described in this disclosure (e.g., the methods 799, 801). In other embodiments, firmware includes instructions for carrying out functionality as described in this disclosure (e.g., the methods 799, 801).

The memory 603 may include various components (e.g., non-transitory, tangible computer-readable storage media) including, but not limited to, a random access memory component (e.g., RAM 604) (e.g., a static RAM "SRAM", a dynamic RAM "DRAM, etc.), a read-only component (e.g., ROM 605), and any combinations thereof. ROM 605 may act to communicate data and instructions uni-directionally to processor(s) 601, and RAM 604 may act to communicate data and instructions bi-directionally with processor(s) 601. ROM 605 and RAM 604 may include any suitable non-transitory, tangible computer-readable storage media. In some instances, ROM 605 and RAM 604 include non-transitory, tangible computer-readable storage media for carrying out the methods 799, 801. In one example, a basic input/output system 606 (BIOS), including basic routines that help to transfer information between elements within computer system 600, such as during start-up, may be stored in the memory 603.

Fixed storage 608 is connected bi-directionally to processor(s) 601, optionally through storage control unit 607. Fixed storage 608 provides additional data storage capacity and may also include any suitable non-transitory, tangible computer-readable media described herein. Storage 608 may be used to store operating system 609, EXECs 610 (executables), data 611, API applications 612 (application programs/interfaces), and the like. Often, although not always, storage 608 is a secondary storage medium (such as a hard disk) that is slower than primary storage (e.g., memory 603). Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide nonvolatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, such as mobile devices and enterprise systems, connected to network 630. Communications to and from computer system 600 may be sent through network interface 620. For example, network interface 620 may receive incoming communications (such as requests or responses from other devices) in the form of one or more packets (such as Internet Protocol (IP) packets) from network 630, and computer system 600 may store the incoming communications in memory 603 for processing. Computer system 600 may similarly store outgoing communications (such as requests or responses to other devices) in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 630, may employ a wired and/or a wireless mode of communication. In general, any network topology may be used.

Information and data can be displayed through a display 632. Examples of a display 632 include, but are not limited to, a liquid crystal display (LCD), an organic liquid crystal display (OLED), a cathode ray tube (CRT), a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621.

In addition to a display 632, computer system 600 may include one or more other peripheral output devices 634 including, but not limited to, an audio speaker, a printer, and any combinations thereof. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the methods 799, 801) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of digital authentication, comprising:
   providing a scanning application on a computing device prior to scanning one or more application features;
   launching the scanning application on the computing device;
   providing user login information to the scanning application;
   scanning the one or more application features, the one or more application features displayed on an application of another computing device;
   authenticating the application on the another computing device based at least in part on the one or more scanned application features;
   displaying first new information in the scanning application;
   displaying second new information in the application of the another computing device;
   sending information related to the one or more scanned application features from the computing device to a processing system;
   comparing the first new information displayed in the scanning application to the second new information in the application of the another computing device;
   determining that the first new information matches the second new information;
   transmitting the user login information from the computing device to one or more of the processing system and the another computing device; and
   authenticating a user based in part on authenticating the application on the another computing device and authenticating the user login information, wherein the user login information is associated with the user.

2. The method of claim 1, wherein
   scanning the one or more application features with the computing device comprises scanning the one or more application features with the scanning application; and
   wherein the scanning application is configured to utilize a camera.

3. The method of claim 1, wherein the user login information comprises login information related to the application, and wherein the method further comprises:
   providing additional authentication information to the processing system, wherein the additional authentication information comprises at least one of biometric information, password information, or a pin number.

4. The method of claim 1, wherein:
   the computing device is configured to confirm that a first image in the first new information in the scanning application is the same image as a second image in the second new information in the application of the another computing device prior to transmitting the user login information.

5. The method of claim 1, wherein at least one of the one or more scanned application features comprises a mobile barcode, and wherein sending information related to the one or more scanned application features further comprises sending an application token, and information related to the mobile barcode.

6. The method of claim 5, wherein authenticating the user is further based on one or more of: information associated with or encoded within the mobile barcode, the application token, and a session identifier.

7. The method of claim 6, further comprising:
   sending one or more communications to one or more of the computing device and the another computing device, wherein the one or more communications include an indication that the user is approved for authentication; and
   enabling the user access to one or more application features associated with at least one of the session identifier, the application token, and the user login information.

8. The method of claim 1, wherein information related to the one or more scanned application features is sent from the computing device to the processing system prior to displaying the first new information and the second new information.

9. The method of claim 1, wherein the first information comprises one or more of a first image, a first sequence of letters, a first sequence of numbers, a first sequence of symbols, a first sound, and a first video, and wherein the second information comprises one or more of a second image, a second sequence of letters, a second sequence of numbers, a second sequence of symbols, a second sound, and a second video.

10. A plurality of non-transitory, tangible, computer-readable storage medium across a plurality of devices, wherein the plurality of non-transitory, tangible, computer-readable storage medium are encoded with processor-readable instructions which, together, perform a method of authenticating a user comprising:
    providing a scanning application on a second computing device prior to scanning one or more application features, wherein the second computing device is associated with a user;
    providing user login information to the scanning application, the user login information comprising information related to the user;
    displaying an application comprising the one or more application features on a first computing device;
    scanning the one or more application features with the second computing device;
    displaying first new information in the scanning application;

displaying second new information in the application of the first computing device;

sending information related to the one or more scanned application features from the second computing device to a processing system;

comparing the first new information displayed in the scanning application to the second new information in the application of the first computing device;

authenticating the application on the first computing device based at least in part on the information related to the one or more scanned application features and determining that the first new information matches the second new information;

transmitting the user login information from the second computing device to one or more of the processing system and the first computing device based at least in part on authenticating the application on the first computing device; and authenticating the user based in part on authenticating the application on the first computing device and authenticating the user login information.

11. The non-transitory tangible computer-readable storage medium of claim 10 wherein, scanning the one or more application features comprises obtaining an image of the one or more application features with a second computing device imaging mechanism.

12. The non-transitory tangible computer-readable storage medium of claim 10, wherein determining that the first new information matches the second new information further comprises confirming that a first image in the first new information in the scanning application is the same image as a second image in the second new information in the application of the first computing device.

13. The non-transitory tangible computer-readable storage medium of claim 12, wherein at least one of the one or more scanned application features comprises a mobile barcode, and wherein sending information related to the one or more scanned application features from the second computing device to the processing system comprises sending information related to the mobile barcode and one or more of an application token and information related to an image of the one or more application features to the processing system.

14. The non-transitory tangible computer-readable storage medium of claim 10, further comprising:

sending additional information from the second computing device to the processing system one of before, after, or generally at the same time as when the information related to the one or more scanned application features is sent from the second computing device to the processing system; and initiating a confirmation for display on the second computing device, wherein, the confirmation informs the user that at least one of the user and the application has been authenticated.

15. The non-transitory, tangible computer-readable storage medium of claim 14 wherein, the additional information comprises at least one of:

a token; a previously-saved token; a mobile barcode, a session ID; biometric information; or password information.

16. A method of providing digital authentication comprising:

accessing an application from a mobile computing device, wherein the application comprises at least one application feature;

displaying the at least one application feature on the mobile computing device;

selecting the at least one application feature;

launching a scanning application on the mobile computing device;

providing user login information to the scanning application;

displaying first new information on the mobile computing device via the application;

displaying second new information on the mobile computing device via the scanning application;

selecting a scanning application feature when the first new information is the same as the second new information;

authenticating the application;

transmitting, via a processing system, the user login information from the scanning application to the application;

authenticating, by the application, a user, wherein authenticating the user is based in part on authenticating the user login information and authenticating the application; and enabling user access to one or more application features.

17. The method of claim 16, wherein the second new information comprises an image related to the application, and wherein:

the mobile computing device comprises a touch screen; and selecting the at least one application feature comprises tapping the at least one application feature on the touch screen.

18. The method of claim 16, wherein, the scanning application is different than the application; and further comprising:

downloading the scanning application on the mobile computing device prior to launching the scanning application on the mobile computing device; and at least one of:

confirming that a first image in the first new information in the application is the same image as a second image in the second new information in the scanning application; or confirming that a first sound in the first new information in the application is the same sound as a second sound in the second new information in the scanning application; or confirming that a first video in the first new information in the application is the same video as a second video in the second new information in the scanning application; or confirming that a first sequence of alphanumeric characters in the first new information in the application is the same sequence of alphanumeric characters as a second sequence of alphanumeric characters in the second new information in the scanning application.

19. The method of claim 16, wherein the user login information comprises login information related to the application, and wherein the method further comprises:

providing additional authentication information to the processing system, wherein the additional authentication information comprises at least one of a pin number;

a password; or biometric information.

20. The method of claim 16, wherein, authenticating the application comprises authenticating the application prior to sending the user login information from the scanning application to the application.

* * * * *